(No Model.)

C. SCAFE.
HAY LOADER.

No. 264,570. Patented Sept. 19, 1882.

WITNESSES:
Gustav Dieterich
C. Sedgwick

INVENTOR:
C. Scafe
BY Munn & Co
ATTORNEYS.

UNITED STATES PATENT OFFICE.

CHARLES SCAFE, OF BANGOR, WISCONSIN.

HAY-LOADER.

SPECIFICATION forming part of Letters Patent No. 264,570, dated September 19, 1882.

Application filed March 15, 1882. (No model.)

*To all whom it may concern:*

Be it known that I, CHARLES SCAFE, of Bangor, in the county of La Crosse and State of Wisconsin, have invented a new and Improved Hay-Loader, of which the following is a full, clear, and exact description.

This invention consists of a simple and efficient arrangement of guides, revolving rakes, and an adjustable inclined carrier upon a two-wheeled hay-rake, for attachment to the hind end of a wagon, to gather up the hay as the wagon and loader pass along over it and deliver it upon the end of the wagon to the attendant, all as hereinafter more fully described.

Reference is to be had to the accompanying drawings, forming part of this specification, in which similar letters of reference indicate corresponding parts in both the figures.

Figure 1:
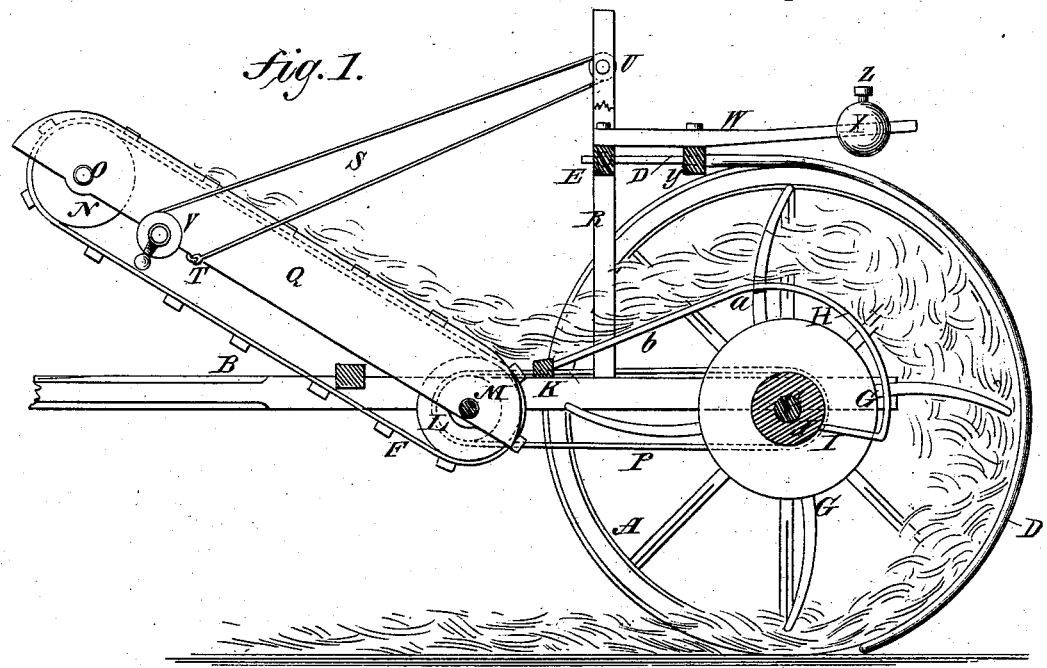
Figure 2:
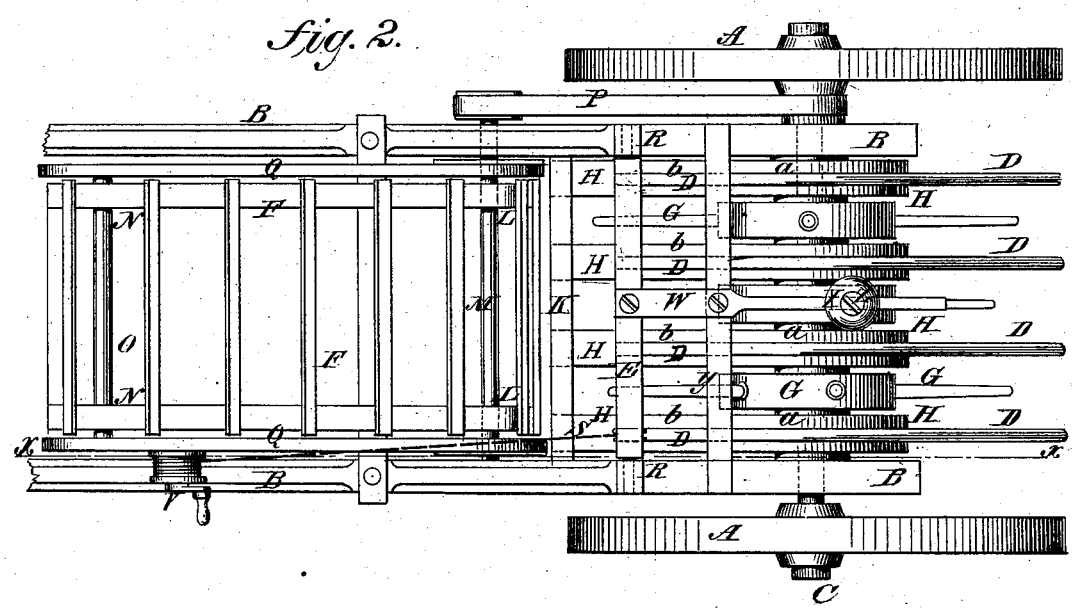

Figure 1 is a longitudinal sectional elevation of my improved hay-loader, taken on the line $x\ x$ of Fig. 2; and Fig. 2 is a plan view.

A represents the wheels, and B the shafts or frame, of a light two-wheeled truck suitable for a hay-rake.

C is the axle, which is keyed fast to the wheels, to be revolved by them.

D represents rake-teeth, of steel wire, attached to the bar E over the front of the wheels, and passing over and back of the axle to the ground, in similar arrangement to rakes in use, to gather up the hay as the machine is drawn along; but instead of being arranged to lift and discharge the hay, they are fixed in position to serve as guides, also, for conducting the hay over the axle and forward onto the lower end of the endless carrier, the hay being caused to so pass up along them by the revolving rakes G, which I attach to the rotating axle for that purpose, and to discharge the hay from these revolving rakes I arrange guides, of curved metal or other strips, H, as shown, with rear ends, I, attached to collars J on the axle at the back side, about where the hay would naturally begin to tend toward the axle, and from these rising by suitable curvatures to a point, $a$, of a sufficient height over the axle to form therefrom suitable descent along parts $b$, to allow the hay to be easily crowded onto the carrier. The said guides are attached at the front ends to a bar, K, or other suitable means of securing them substantially to the frame.

The carrier is of the usual form, working over pulleys L on the driving-shaft M at the lower end and pulleys N on the carrier-shaft O at the upper end. The lower driving-shaft is mounted in suitable bearings in the truck-frame, and is operated for working the carrier by the belt P from a pulley on the axle to a pulley on it. This shaft serves for the support of the side bars, Q, of the carrier at their lower ends; also for the pivot whereon bars Q turn for elevating or depressing the upper end of the carrier, according to the height of the load on which it delivers the hay. For so shifting the carrier, the side bars are suspended from the posts R by a cord, S, at each side, attached at T, passing over pulley U on the post and back to the windlass V, mounted on the bars of the carrier, near the upper end, where it can be worked by the person receiving and arranging the hay on the load in a way to readily raise the carrier from time to time as the load increases in height. A ratchet and pawl or other suitable device for catching and holding the windlass will be employed.

To vary the pressure of the rake-fingers D upon the ground as frequently required by the varying conditions of the surface and other causes, I have arranged a pressure-lever, W, with an adjustable weight, X, thereon, and a cross-bar, Y, to rest upon the fingers D, as shown, a little back of the head-bar E, to which they are attached, so that the pressure may be varied at will by shifting the weight one way or the other on said lever. A set-screw, Z, secures the weight in position.

Having thus fully described my invention, what I claim as new, and desire to secure by Letters Patent, is—

The combination, with a vehicle, A B C, of the teeth D, attached to a bar, E, the revolving rakes G, attached to a rotary axle, the guides H I, attached to a bar, K, and by collars to the axle, and the endless carrier F, as and for the purpose described.

CHARLES SCAFE.

Witnesses:
 ALFRED MENGEL,
 LOUIS DIXEN.